United States Patent [19]

Yamamoto

[11] Patent Number: 5,184,012
[45] Date of Patent: Feb. 2, 1993

[54] OPTICAL SCANNING APPARATUS WITH AXIS DEVIATION CORRECTION

[75] Inventor: Mitsunori Yamamoto, Tokyo, Japan

[73] Assignee: Olympus Optical Co., Ltd., Tokyo, Japan

[21] Appl. No.: 813,813

[22] Filed: Dec. 26, 1991

[51] Int. Cl.$^5$ .............................................. H01J 3/14
[52] U.S. Cl. ................................... 250/234; 359/202
[58] Field of Search ............... 250/216, 234, 236, 235; 359/201, 202, 212

[56] References Cited

U.S. PATENT DOCUMENTS 4,714,830 12/1987 Usui ...................................... 250/234
4,734,578 3/1988 Horikawa .
5,035,476 7/1991 Ellis et al. ............................ 359/202

FOREIGN PATENT DOCUMENTS 61-217014 9/1986 Japan .
61-219919 9/1986 Japan .

Primary Examiner—David C. Nelms
Attorney, Agent, or Firm—Frishauf, Holtz, Goodman & Woodward

[57] ABSTRACT

An optical scanning apparatus comprises a light source, a converging lens for converging a beam emitted by the light source and forming a beam spot on an object, a first optical deflecting system, movably arranged in the optical path and between the light source and the converging lens, for causing the beam spot formed on the object to move in a first direction, a second optical deflecting system, movably arranged in the optical path and between the first optical deflecting system and the converging lens, for causing the beam spot to move in a second direction, and a movable mirror, arranged in the optical path and between the light source and the first optical deflecting system for correcting the deviation of the optical axis due to the movement of the first and second optical deflecting system. At least one of the first and second deflecting means is moved so that a conjugate plane with respect to the pupil of the converging lens is located at a desired portion between the first and second optical deflecting system.

14 Claims, 6 Drawing Sheets

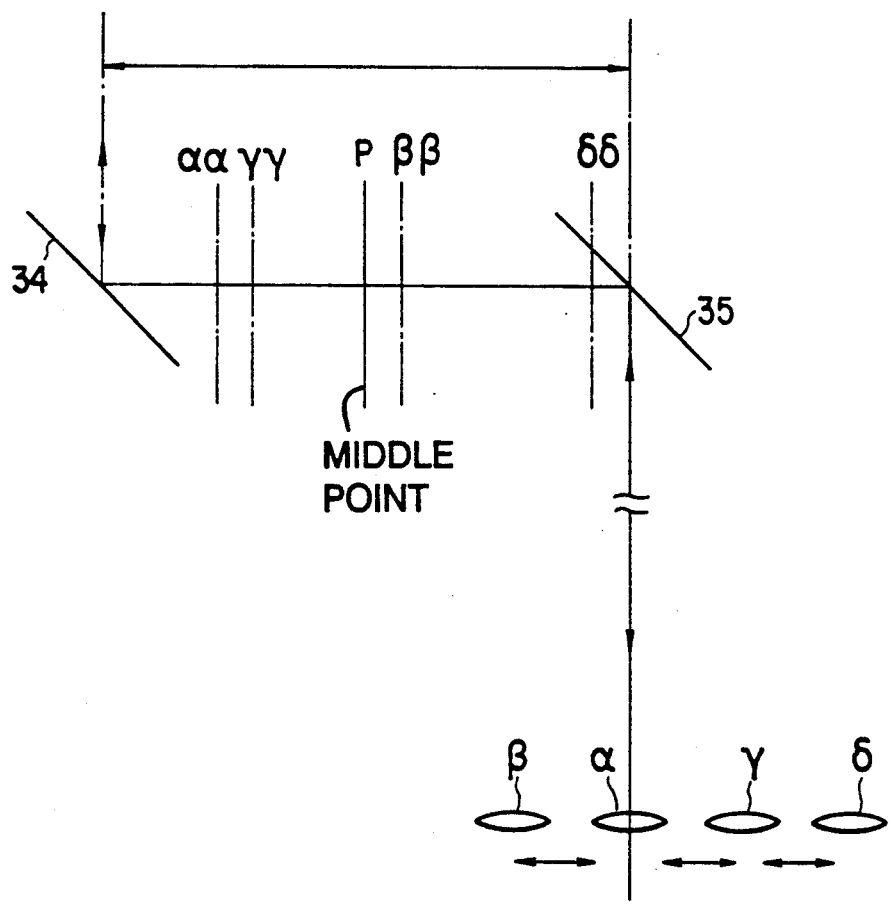
F I G. 2

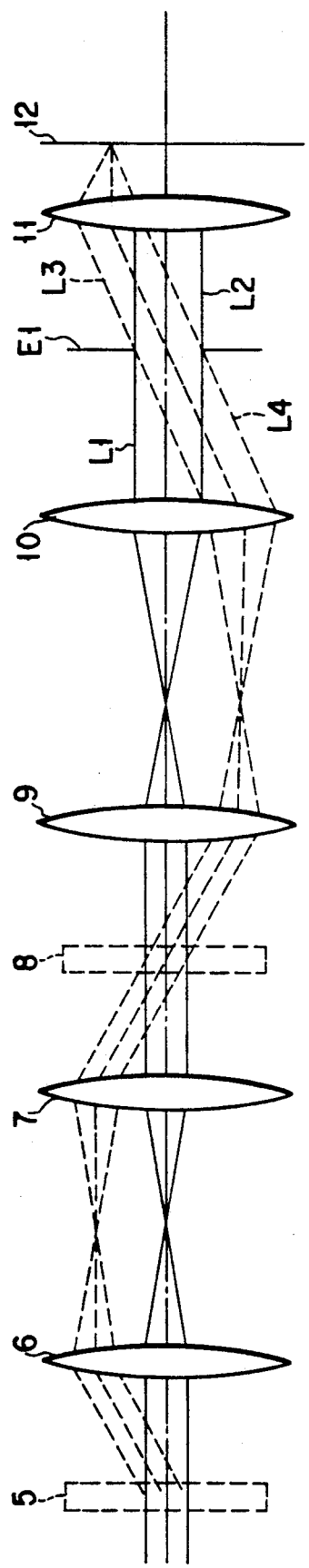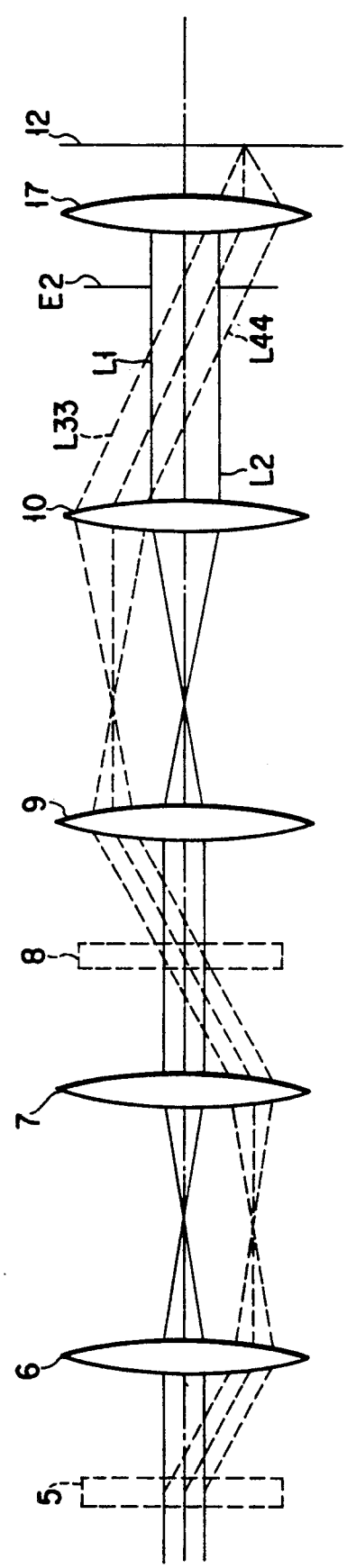

OPTICAL SCANNING APPARATUS WITH AXIS DEVIATION CORRECTION

BACKGROUND OF THE INVENTION

1. Field of the Invention

The present invention relates to an optical scanning apparatus, for use in, for example, a microscope, for scanning an object which is to be inspected.

2. Description of the Related Art

FIG. 5 shows an optical-scanning type microscope having a optical scanning system which is well-known in the art. In the optical scanning system shown in FIG. 5, a laser beam 2 emitted from a laser source 1 is expanded by a beam expander 3 to a desired diameter. The expanded laser beam passes through a beam splitter 4, and applied to a first optical deflecting system 5. The direction of the beam is changed by the first optical deflecting system 5 and the beam spot formed on the sample 12 (to be described later) is moved in a direction (Y direction) in accordance with the operation of the first optical deflecting system 5.

The first optical deflecting system 5 is located at a conjugate position with respect to the pupil of an objective lens which will be described later. The beam deflected by the first optical deflecting system 5 is applied to a second optical deflecting system 8 via pupil transmission lenses 6 and 7.

The second optical deflecting system 8 is located at a conjugate position with respect to the pupil of the objective lens and deflects the beam in an X direction which is perpendicular to the Y direction. The beam deflected by the second optical deflecting system 8 are applied to the objective lens 11 via a pupil transmission lens 9 and an image forming lens 10. The objective lens 11 forms a beam spot on a portion of the sample 12.

Since the first and second optical deflecting system 5 and 8 are located at positions conjugate to the pupil of the objective lens 11, when the optical beam is deflected in the X and Y directions by means of the optical deflecting systems 5 and 8, the beam spot moves on the sample 12 in the X and Y directions in a state that the optical axis is maintained. In other words, the sample 12 is scanned in the X and Y directions by the beam spot.

If the sample 12 is transparent, the beam transmitted through the sample 12 is applied via a condenser lens to an optical detector 14.

If the sample 12 is reflective, the beam reflected by the sample 12 returns along the path, reflected by the semi-transparent surface of the beam splitter 4, and applied via a converging lens 15 to an optical detector 16.

FIG. 6A shows an optical system from the optical deflecting system 5 to the objective lens 11. Since the pupil E1 of the objective lens 11 is conjugate with respect to the optical deflecting systems 5 and 8, the centers of the beams deflected by the optical deflecting systems 5 and 8 coincide with an on-the-axis main beam and pass the center of the pupil E1. The uppermost and lowermost lights L1 and L2 of the on-the-axis beam meet the uppermost and lowermost lights L3 and L4 of the off-the-axis beam in the pupil E1. Thus, the diameter of the laser beam at the pupil position is substantially the same as that of the pupil of the objecting lens 11 regardless of the deflection angles of the first and second optical deflecting systems 5 and 8.

However, since the above optical scanning system of the conventional type includes the pupil transmission lenses 6 and 7 between the first and second optical deflecting systems 5 and 8 in order to make the deflecting systems 5 and 8 conjugate the pupil E1 of the objective lens 11, the entire system is inevitably large.

Moreover, since the first and second deflecting systems 5 and 8 are fixed, the pupil of the objective lens which is conjugate with respect to the deflecting systems 5 and 8 by virtue of the pupil transmission lenses 6 and 7 is also fixed. Hence, when an objective lens is replaced with another lens having a different pupil position, the peripheral portion of the beam incident on the objective lens is off the pupil, resulting in limb darkening, since the peripheral portion of the beam does not pass the pupil.

The limb darkening phenomenon will be described with reference to FIG. 6B.

In the system shown in FIG. 6B, an objective lens 17 has a pupil at a different position from that of the objective lens 11 in FIG. 6A. Accordingly, the pupil E2 of the objective lens 17 is not in a position conjugate to the optical deflecting systems 5 and 8.

In this case, the center of the beam deflected by the deflecting systems 5 and 8 does not pass the center of the pupil E2 of the objective lens 17. The uppermost and lowermost lights L1 and L2 of the on-the axis beam do not meet the uppermost and lowermost lights 33 and 44 of the off-the axis beam at the pupil position E2.

FIG. 7A shows a state of the beam which passes the pupil E2 shown in FIG. 6B. As is shown in FIG. 7A, an on-the-axis beam 20 passes within the pupil 21 of the objective lens 17. However, a deflected off-the-axis light beam 22 passes off the pupil 21, and the shadowed portion of the beam 22, which is off the pupil 21, does not applied to the sample. The area of the shadowed portion increases in accordance with increase of the deflection angle, thereby causing a limb darkening phenomenon.

Further, in the conventional optical scanning system, the diameter of a beam incident on the optical deflecting systems 5 and 8 is unchangeable, although the pupils of objective lenses have various diameters. Therefore, the diameters of an on-the-axis beam 23 and an off-the-axis beam 24 may be greater than that of the pupil 21, as is shown in FIG. 7B. In this case, although no limb darkening occur, the beam cannot be used efficiently.

SUMMARY OF THE INVENTION

The present invention has been conceived in consideration of the above circumstances, and its object is to provide a compact optical scanning apparatus with a small loss of quantity of light, wherein limb darkening does not occur, even if objective lenses having different pupil positions are selectively used.

To achieve the above object, according to the optical scanning apparatus of the present invention, a beam emitted from a light source is converged by a desired converging lens selected from a plurality of converging lenses having different pupil positions on an object which faces the converging lens. A scanning optical system is interposed on the optical axis between the light source and the converging lens, and deflects an incident beam in first and second directions which are perpendicular to each other, thereby optically scanning an object by a beam spot formed thereon.

According to an aspect of the present invention, the scanning optical system comprises a first optical deflecting element for deflecting a light beam emitted from the light source in a first direction, a second optical deflecting element for deflecting the light beam deflected by the first optical deflecting element in a second direction perpendicular to the first direction, a moving mechanism for moving at least one of the first and second optical deflecting elements so that a desired position between the first and second optical deflecting elements coincides with a conjugate position with respect to the pupil of the converging lens, and a movable mirror for correcting deviation of the optical axis caused by the movement of the first or second optical deflecting elements by means of the moving mechanism.

According to another aspect of the present invention, the scanning optical system comprises a first optical deflecting element for deflecting a light beam emitted from the light source in a first direction and a second optical deflecting element for deflecting the light beam deflected by the first optical deflecting element in a second direction perpendicular to the first direction. The first and second optical deflecting elements are arranged so that an average position of planes which are conjugate to the pupil positions of converging lenses substantially coincides with the middle point between the first and second optical deflecting elements.

The optical scanning apparatus may further comprise a beam-diameter changing system, interposed between the light source and the first optical deflecting element, for changing the diameter of the beam which is to be applied the first optical deflecting element.

At least one of the first and second optical deflecting elements is moved so that a plane conjugate to the pupil position of the converging lens is positioned at the middle point between the first and second optical deflecting elements. Deviation of the optical axis caused by the movement is corrected by moving the movable mirror.

As a result, even if the converging lens is replaced with another one and the pupil position is changed, a conjugate position with respect to the pupil can be at the middle point between the first and second deflecting elements. Thus, the incident beam is prevented from deviating from the pupil.

Moreover, since it is unnecessary to interpose a pupil transmission lens between the first and second optical deflecting elements, the first and second optical deflecting elements can be close to each other. As a result, a compact scanning apparatus can be obtained.

In addition, the first and second optical deflecting elements are arranged such that an average position of planes which conjugate the pupil positions of the converging lenses substantially coincides with the middle point between the first and second optical deflecting elements. Therefore, whatever one is selected from the objective lenses, deviation of the incident beam on the pupil is suppress to a minimum.

Further, the diameter of the light beam can be adjusted in accordance with the change of the diameter of the pupil, even if the converging lens is replaced with another one.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing first and second deflecting systems of the present invention;

FIG. 6A is a diagram showing a state wherein light beams coincide with the pupil of the objective lens;

FIG. 6B is a diagram showing a state wherein light beams deviate from the pupil of the objective lens;

DETAILED DESCRIPTION OF THE PREFERRED EMBODIMENTS

Embodiments of the present invention will now be described with reference to the accompanying drawings.

Figure 1:
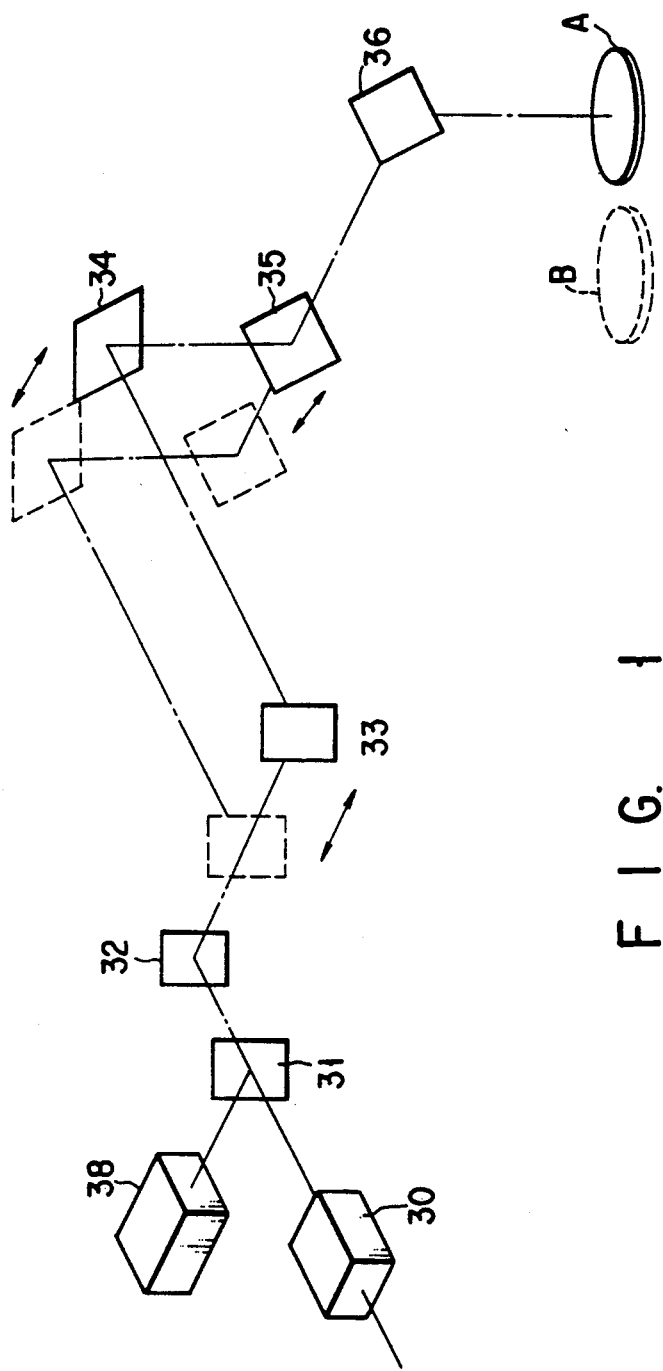
FIG. 1 is a diagram showing the optical system of an optical scanning apparatus according to an embodiment of the present invention.

FIG. 1 shows a first embodiment of the present invention. In this embodiment, a light beam emitted from a light source is applied to an optical beam-diameter changing system 30. The optical beam-diameter changing system enlarges and reduces the diameter of the incident beam to a desired length.

The beam, the diameter of which is adjusted to a predetermined length by the optical beam-length changing system, is transmitted through a dichroic mirror 31 and applied to a fixed mirror 32. The beam reflected by the fixed mirror 31 is again reflected by a movable mirror 33, and applied to a first optical deflecting system 34.

The first optical deflecting system deflects the incident beam in a Y direction, for example. The beam deflected by the first optical deflecting system 34 is applied to a second optical deflecting system 35. The second optical deflecting system 35 deflects the incident beam in an X direction, perpendicular to the Y direction.

Each of the first and second optical deflecting systems comprises a movement mechanism (not shown). When the objective lens is replaced with another one and the pupil position is changed, the movement mechanism can move the deflecting system in a direction such that the deviation of the pupil position is corrected.

In accordance with the movement of the first or second optical deflecting system 34 or 35, the optical axis between the movable mirror 33 and the first optical deflecting system 34 changes. To correct the change of the optical axis, the apparatus of the invention includes another movement mechanism (not shown) for moving the movable mirror 33.

The beam reflected by the second optical deflecting system 35 is reflected by a fixed mirror 36 and incident on an objective lens A. The beam is converged by the objective lens A and forms a spot on a sample.

In this embodiment, a conjugate plane, which conjugates the pupil position of the converging lens A, is at the middle point between the first and second optical deflecting systems 34 and 35 by moving the systems 34 and 35 by means of the movement mechanisms.

Figure 5:
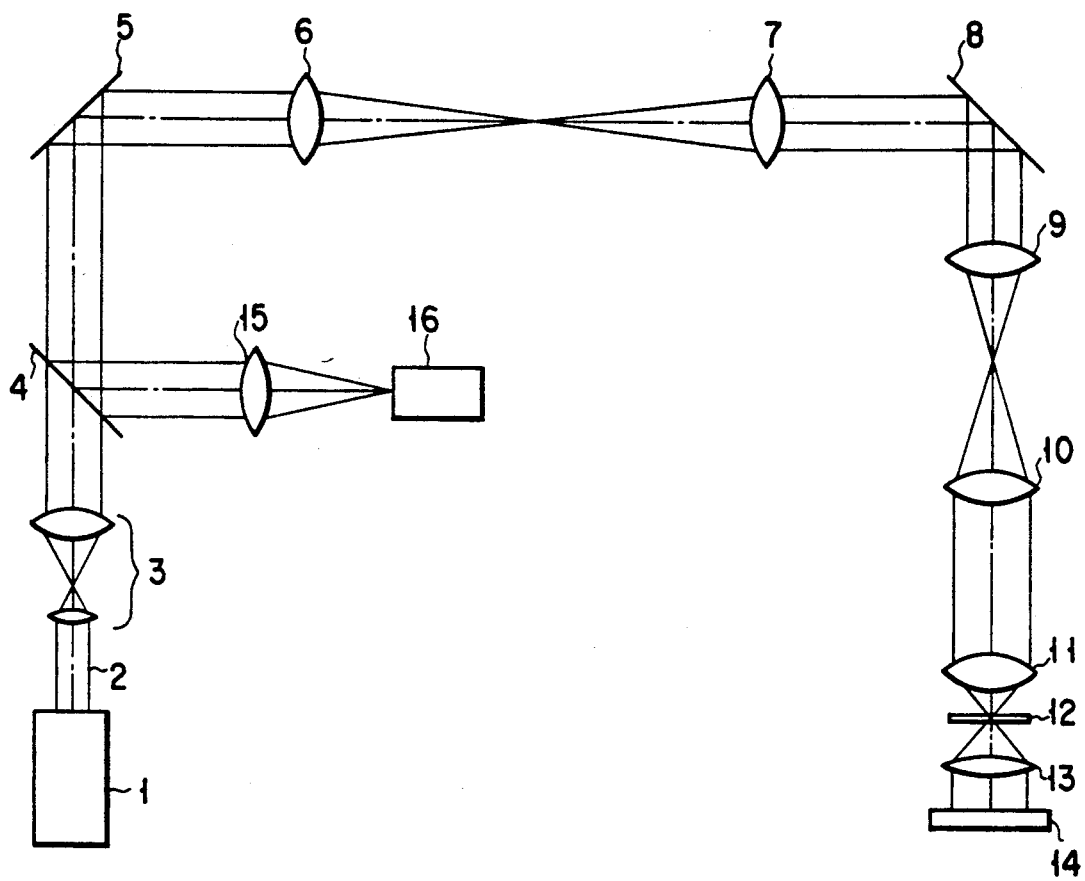
FIG. 5 is a diagram showing the optical system of a conventional optical scanning apparatus.
Figure 7A:
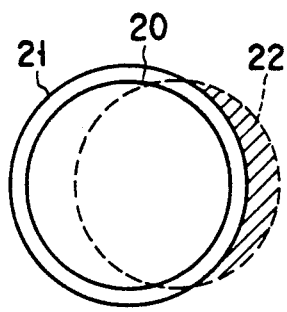
FIG. 7A is a diagram showing a state of the pupil position, in a case where a light beam deviates from the center of the pupil.
Figure 7B:
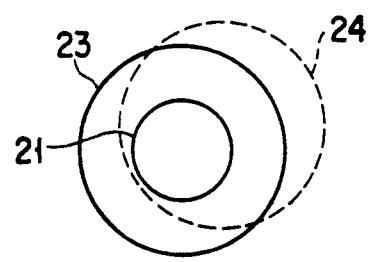
FIG. 7B is a diagram showing a state of the pupil position, in a case where diameters of on-the-axis and off-the-axis beams are larger than that of the pupil.

If the sample to be inspected is transparent, an optical detecting device as shown in FIG. 5 is provided under the rear surface of the sample. The optical detecting device is used when the sample is transparent. The optical detecting device detects the beam which has scanned the sample and passed therethrough and converts the beam to an electric signal.

If the sample to be inspected is reflective, an optical detecting device a shown in FIG. 1, constituted by the dichroic mirror 31 and an optical detecting system 38, is used. The dichroic mirror 31 allows passage of a beam emitted from the light source and reflects a beam returned from the objective lens A. The beam returned from the objective lens A and reflected by the dichroic mirror 31 is applied to the optical detecting system 38. The optical detecting system 38 converts the incident beam to an electric signal.

Figure 3A:
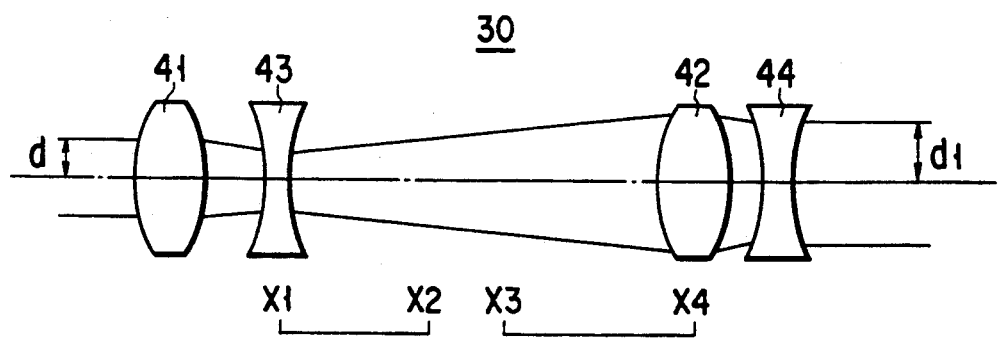
FIG. 3A is a diagram showing a state of the beam-diameter changing system, in a case where the diameter is enlarged.
Figure 3B:
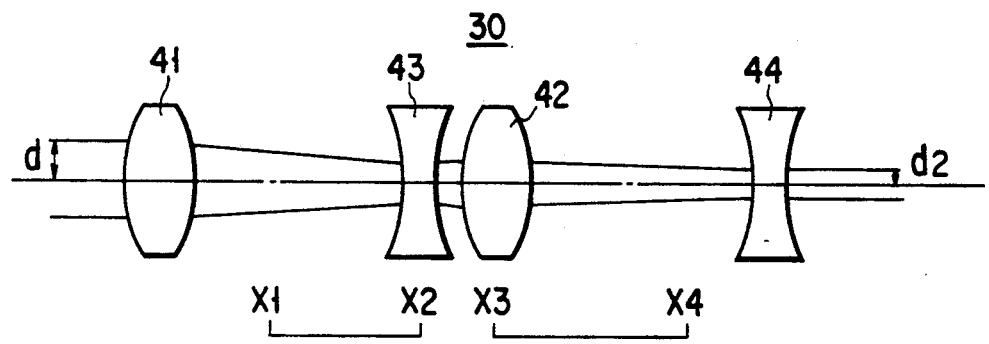
FIG. 3B is a diagram showing another state of the beam-diameter changing system, in a case where the diameter is reduced.

As shown in FIGS. 3A and 3B, the optical beam-diameter changing system 30 comprises convex lenses 41 and 42 and concave lenses 43 and 44. The lenses 42 and 43, facing each other, are continuously movable within optical axis regions X1-X2 and X3-X4, respectively. In the optical beam-diameter changing system 30, when the lenses 43 and 42 are respectively located at the points X1 and X4, as shown in FIG. 3A, the incident beam is converged by the lens 41 and the diameter of the beam is reduced only slightly by the lens 41, since the distance between the lenses 41 and 43 is short. However, since the distance between the lenses 42 and 43 is long, the beam is expanded in the region X1-X4. As a result, the beam going out the lens 44 has a diameter D1 ($=2 \times d$) longer than the diameter D ($=2 \times d$) of the incident beam.

In contrast, when the lenses 43 and 42 are respectively located at the points X2 and X3, the diameter of the incident beam is considerably reduced in a region between the lenses 41 and 43. As a result, the beam going out the lens 44 has a diameter D2 ($=2 \times d2$) shorter than the diameter D.

In this manner, even if the diameter of the incident beam is unchanged, the diameter of the beam going out of the system 30 can be continuously changed by moving the lenses 43 and 42.

As described above, according to this embodiment, the diameter of a light beam emitted from the light source is adjusted substantially the same as that of the pupil of the objective lens A by means of the optical beam-diameter changing system 30.

After the diameter of the beam is adjusted in this manner, the beam is applied via the movable mirror 33 to the first optical deflecting system 34, reflected by the same and then applied to the second optical deflecting system 35.

The first and second deflecting systems 34 and 35 are adjusted by the movement mechanisms as described above, so that a conjugate plane with respect to the pupil position of the objective lens A is located halfway between the first and second deflecting mechanisms 34 and 35.

Accordingly, the center of the beam deflected by the first and second optical deflecting systems 34 and 35 passes substantially the center of the pupil of the objective lens. In addition, the on-the-axis beam and the off-the-axis beam meet each other substantially at the pupil position.

The beam is thus controlled so as to pass substantially the center of the pupil of the objective lens and converged on the sample. The incident beam is deflected in the Y direction by the first optical deflecting system 34 and in the X direction by the second optical deflecting system 35, thereby scanning the sample in the X and Y directions by the beam spot formed thereon. Since the detection of the beam transmitted through or reflected by the sample by the scanning in the X and Y directions was described before, detailed explanations are omitted here.

As has been described above, according to this embodiment, the movement mechanisms move the first and second optical deflecting systems so that a conjugate plane with respect to the pupil of the converging lens A is positioned halfway between the first and second optical deflecting systems 34 and 35. The deviation of the optical axis caused by this movement is corrected by moving the movable mirror 33. For this reason, deviation of the beam from the pupil of the objective lens is small and limb darkening is suppressed to a minimum.

A second embodiment of the present invention will now be described.

FIG. 2 shows a main part of the second embodiment. In this embodiment, the first and second optical deflecting systems 34 and 35 are unmovable and fixed at positions as shown in FIG. 2.

In FIG. 2, $\alpha\alpha$ to $\delta\delta$ represent conjugate positions with respect to the pupils of a plurality of objective lenses $\alpha$ to $\delta$, which are exchangeable for one another. A point P is the middle point between the first and second optical deflecting systems 34 and 35, and corresponds to an average point of the positions $\alpha\alpha$ to $\delta\delta$. In other words, the middle point between the first and second optical deflecting systems 34 and 35 coincides with the average point of the conjugate positions with respect to the pupils of the lenses $\alpha$ to $\delta$.

The second embodiment differs from the first embodiment shown in FIG. 1 merely in that the movement mechanisms for moving the first and second optical deflecting systems 34 and 35, the movable mirror 33 and its movement mechanism are excluded from the optical scanning system.

In the conventional optical scanning system, if the first and second optical deflecting systems 34 and 35 are located at the points $\delta\delta$ and the objective lens $\alpha$ is used, the beam greatly deviates from the pupil of the objective lens $\alpha$, resulting in considerable limb darkening. In contrast, according to the present invention, the deviation of the beam from the pupil of the objective lens is suppressed to a minimum by virtue of the above-mentioned structure, whatever one is selected from the objective lenses $\alpha$ to $\delta$.

The beam is thus controlled so as to pass substantially the center of the pupil of the objective lens and converged on the sample. Hence, limb darkening on the optical detector is suppressed to a minimum, whatever objective lens is used.

The following are comparison between the conventional optical scanning system and the present invention.

In the conventional art, assuming that the focal length of the pupil transmission lenses 6 and 7 is f, the distance L1 between the optical deflecting systems 5 and 8 is equal to 4f. To decrease L1, it is necessary to reduce the focal length f of the pupil transmission lenses 6 and 7. However, if the focal length f is reduced, it is difficult to correct the aberration of the pupil transmission lenses and the pupil transmission lenses may be brought in contact with the optical deflecting systems since the focus is close to the pupil transmission lenses. Therefore, the focal length f can be reduced only to a limited value, for example, 40 mm. In this case, the distance between the optical deflecting systems is obtained by the following formula:

$$L1 = -4 \times 40 = 160 \ (mm)$$

Figure 4:
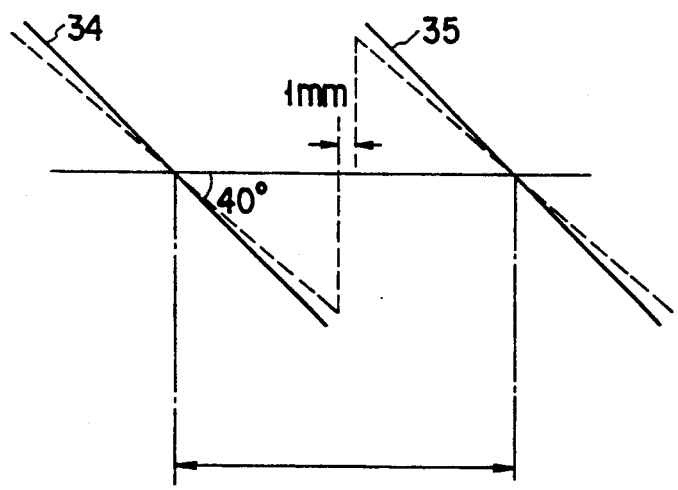
FIG. 4 is a diagram showing first and second deflecting elements of a galvanometer scanner.

According to the second embodiment, the distance L2 between the first and second optical deflection systems 34 and 35 is reduced to a length such that the reflection mirrors of these deflection systems are not brought into contact with each other. For example, if the optical deflection systems are applied to a galvanometer scanner comprising mirrors having a diameter of 7 mm, as shown in FIG. 4, the distance between the mirrors is obtained as follows:

$$3.5 \times Cos(40°) \times 2 = 2.7 \times 2$$

If the swing angle of the mirrors is ±5°, and a 1 mm margin is added between the mirrors, the distance L2 is obtained by the following formula:

$$L2 = 2.7 \times 2 + 1 = 6.4 \ (mm)$$

Thus, the distance between the first an second deflecting systems is much shorter than that in the conventional art.

As described above, the middle point between the first and second optical deflecting systems 34 and 35 corresponds to the average point of the conjugate positions with respect to the pupils of the objective lenses α to δ, to suppress deviation of the beam from the pupils of the lenses α to δ to a minimum, when a sample is optically scanned. Since it is unnecessary to interpose pupil transmission lenses between the first and second optical deflecting systems, a simple and compact scanning apparatus is obtained. Moreover, a plurality of objective lenses having different pupil positions can be selectively used in one scanning apparatus.

Further, the scanning apparatus of this embodiment may comprise an optical beam-diameter changing system 30 as in the first embodiment, to control the diameter of the beam in accordance with the change of the diameter of the pupil when the objective lens is replaced with another one. Thus, the diameter of the beam can be substantially the same as that of the pupil and the beam can be effectively utilized.

Additional advantages and modifications will readily occur to those skilled in the art. Therefore, the invention i its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical scanning apparatus comprising:
   a light source;
   a converging lens for converging a beam emitted by said light source and forming a beam spot on an object;
   first deflecting means, movably arranged in an optical path and between said light source and said converging lens, for continuously changing an angle of the beam going out therefrom, thereby causing the beam spot formed on the object to move in a first direction;
   second deflecting means, movably arranged in the optical path and between said first deflecting means and said converging lens, for continuously changing an angle of the beam going out therefrom thereby causing the beam spot formed on the object to move in a second direction; and
   correcting means, arranged in the optical path and between said light source and said first deflecting means, for correcting deviation of an optical axis due to the movement of said first and second deflecting means,
   wherein at least one of said first and second deflecting means is moved so that a conjugate plane with respect to a pupil of said converging lens is located at a desired portion between said first and second deflecting means.

2. An apparatus according to claim 1, wherein said first and second deflecting means are positioned so that the conjugate plane with respect to the pupil of said converging lens is located at a middle point between said first and second deflecting means.

3. An apparatus according to claim 1, wherein said first and second deflecting means are positioned so that the conjugate plane with respect to the pupil of said converging lens is located within a predetermined region including the middle point between said first and second deflecting means.

4. An apparatus according to claim 1, wherein both of said first and second deflecting means are moved so that the conjugate plane with respect to the pupil of said converging lens is located at a desired portion between said first and second deflecting means.

5. An apparatus according to claim 1, wherein said correcting means includes a movable mirror, which is movable in accordance with the movement of said first and second deflecting means, for reflecting the beam emitted from said light source to said first deflecting means and reflecting the beam applied from said first deflecting means to said light source.

6. An apparatus according to claim 1, further comprising an optical beam-diameter changing system, arranged in the optical path and between said light source and said correcting means, for changing the diameter of the beam emitted by said light source and applying the beam to said correcting means.

7. An apparatus according to claim 6, wherein said optical beam-diameter changing system includes a first convex and concave lenses a predetermined distance spaced apart and fixed on the same optical axis, a second concave lens movable on the optical axis between said first convex and concave lenses within a predetermined region near said first convex lens, and a second convex lens movable on the optical axis between said first convex and concave lenses within a predetermined region near said first concave lens.

8. An apparatus according to claim 1, further comprising a dichroic mirror arranged in the optical path and between said light source and said correcting means, and optical detecting means for receiving the beam reflected by said dichroic mirror from the correcting means side and converting it to an electric signal.

9. An apparatus according to claim 1, further comprising optical detecting means for receiving the beam transmitted through said object and converting it to an electric signal.

10. An optical scanning apparatus comprising:

a light source;

a converging lens for converging a beam emitted by said light source and forming a beam spot on an object;

first deflecting means, arranged in an optical path and between said light source and said converging lens, for continuously changing an angle of the beam going out therefrom, thereby causing the beam spot formed on the object to move in a first direction; and second deflecting means, arranged in the optical path and between said first deflecting means and said converging lens, for continuously changing an angle of the beam going out therefrom, thereby causing the beam spot formed on the object to move in a second direction;

wherein said first and second deflecting means are positioned so that an average position of conjugate planes with respect to the pupils of a plurality of converging lenses which are exchangeable for said converging lens coincides with a middle point between said first and second deflecting means.

11. An apparatus according to claim 10, further comprising an optical beam-diameter changing system, arranged in the optical path and between said light source and said first deflecting means, for changing a diameter of the beam emitted by said light source and applying the beam to said first deflecting means.

12. An apparatus according to claim 11, wherein said optical beam-diameter changing system includes first convex and concave lenses a predetermined distance spaced apart and fixed on the optical axis, a second concave lens movable on the optical axis between said first convex and concave lenses within a predetermined region near said first convex lens, and a second convex lens movable on the optical axis between said first convex and concave lenses within a predetermined region near said first concave leans.

13. An apparatus according to claim 10, further comprising a dichroic mirror arranged in the optical path and between said light source and said first deflecting means, and optical detecting means for receiving the beam reflected by said dichroic mirror from the first deflecting means side and converting it to an electric signal.

14. An apparatus according to claim 10, further comprising optical detecting means for receiving the beam transmitted through said object and converting it to an electric signal.

* * * * *